United States Patent
Smith, II et al.

(10) Patent No.: US 9,342,358 B2
(45) Date of Patent: May 17, 2016

(54) SYSTEM AND METHOD FOR SYNCHRONIZING PROCESSOR INSTRUCTION EXECUTION

(75) Inventors: William David Smith, II, Schenectady, NY (US); Safayet Nizam Uddin Ahmed, Atlanta, GA (US); Jon Marc Diekema, Grand Rapids, MI (US)

(73) Assignee: General Electric Company, Niskayuna, NY (US)

( * ) Notice: Subject to any disclaimer, the term of this patent is extended or adjusted under 35 U.S.C. 154(b) by 776 days.

(21) Appl. No.: 13/620,047

(22) Filed: Sep. 14, 2012

(65) Prior Publication Data

US 2014/0082331 A1 Mar. 20, 2014

(51) Int. Cl.
| | |
|---|---|
| G06F 7/38 | (2006.01) |
| G06F 9/00 | (2006.01) |
| G06F 9/44 | (2006.01) |
| G06F 9/48 | (2006.01) |
| G06F 11/16 | (2006.01) |
| G06F 11/18 | (2006.01) |
| G06F 11/20 | (2006.01) |

(52) U.S. Cl.
CPC .......... *G06F 9/4887* (2013.01); *G06F 11/1691* (2013.01); *G06F 11/182* (2013.01); *G06F 11/2038* (2013.01); *G06F 2201/815* (2013.01)

(58) Field of Classification Search
CPC .......................... G06F 9/4887; G06F 11/1691
USPC ....................................................... 712/220
See application file for complete search history.

(56) References Cited

U.S. PATENT DOCUMENTS

| | | | |
|---|---|---|---|
| 4,589,066 A | 5/1986 | Lam et al. |
| 5,233,615 A | 8/1993 | Goetz |
| 5,295,258 A | 3/1994 | Jewett et al. |
| 5,537,655 A | 7/1996 | Truong |
| 5,550,736 A | 8/1996 | Hay et al. |

(Continued)

FOREIGN PATENT DOCUMENTS

| | | |
|---|---|---|
| EP | 1146423 A2 | 10/2001 |
| FR | 2912526 A1 | 8/2008 |
| WO | 2010067105 A1 | 6/2010 |

OTHER PUBLICATIONS

European Search Report and Written Opinion issued in connection with corresponding EP Application No. 13184182.7-1954 dated Dec. 13, 2013.

(Continued)

*Primary Examiner* — Chun-Kuan Lee
(74) *Attorney, Agent, or Firm* — John P. Darling

(57) ABSTRACT

A system and method for controlling processor instruction execution. In one example, a method for synchronizing a number of instructions performed by processors includes instructing a first processor to iteratively execute instructions via a first set of iterations until a predetermined time period has elapsed. A number of instructions executed in each iteration of the first set of iterations is less than a number of instructions executed in a prior iteration of the first set of iterations. The method also includes instructing a second processor to iteratively execute instructions via a second set of iterations until the predetermined time period has elapsed. A number of instructions executed in each iteration of the second set of iterations is less than a number of instructions executed in a prior iteration of the second set of iterations. The method includes determining whether additional instructions are to be executed.

14 Claims, 5 Drawing Sheets

(56) References Cited

U.S. PATENT DOCUMENTS

| | | |
|---|---|---|
| 5,557,623 A | 9/1996 | Discoll |
| 5,572,620 A | 11/1996 | Reilly et al. |
| 5,613,127 A | 3/1997 | Schultz |
| 5,742,753 A | 4/1998 | Nordsieck et al. |
| 5,845,060 A | 12/1998 | Vrba et al. |
| 5,896,523 A | 4/1999 | Bissett et al. |
| 6,279,119 B1 | 8/2001 | Bissett et al. |
| 6,367,031 B1 | 4/2002 | Yount |
| 6,374,364 B1 | 4/2002 | McElroy et al. |
| 6,895,582 B1 | 5/2005 | Greve |
| 6,938,183 B2 | 8/2005 | Bickel |
| 6,948,091 B2 | 9/2005 | Bartels et al. |
| 7,558,883 B1 | 7/2009 | Lamport |
| 7,565,433 B1 | 7/2009 | Lamport |
| 7,620,680 B1 | 11/2009 | Lamport |
| 7,817,565 B2 | 10/2010 | Cabaret et al. |
| 8,205,201 B2 | 6/2012 | Ple |
| 2003/0061535 A1 | 3/2003 | Bickel |
| 2005/0149609 A1 | 7/2005 | Lamport |
| 2005/0283373 A1 | 12/2005 | Lamport et al. |
| 2005/0283644 A1 | 12/2005 | Lorch et al. |
| 2006/0062143 A1 | 3/2006 | Bibby et al. |
| 2006/0136781 A1 | 6/2006 | Lamport |
| 2006/0143517 A1 | 6/2006 | Douceur et al. |
| 2006/0168011 A1 | 7/2006 | Lamport |
| 2006/0184627 A1 | 8/2006 | Howell et al. |
| 2006/0200278 A1 | 9/2006 | Feintuch |
| 2006/0259818 A1 | 11/2006 | Howell et al. |
| 2007/0214340 A1 | 9/2007 | Leveille et al. |
| 2007/0214355 A1 | 9/2007 | Lamport |
| 2007/0299955 A1 | 12/2007 | Hoffman et al. |
| 2008/0022151 A1 | 1/2008 | Stange et al. |
| 2008/0126502 A1 | 5/2008 | Holt |
| 2008/0196037 A1 * | 8/2008 | Ple ............................ 718/107 |
| 2009/0031115 A1 | 1/2009 | Pruiett et al. |
| 2009/0150566 A1 | 6/2009 | Malkhi et al. |
| 2010/0107158 A1 | 4/2010 | Chen et al. |

OTHER PUBLICATIONS

Kyriakopoulos et al., "An optimal scheduling scheme for tiling in distributed systems", Cluster Computing, 2007 IEEE International Conference on, IEEE, Piscataway, NJ, USA, pp. 267-274, Sep. 17, 2007.

Douceur et al., Replicated Virtual Machines, MSR TR-2005-119, Sep. 2005.

* cited by examiner

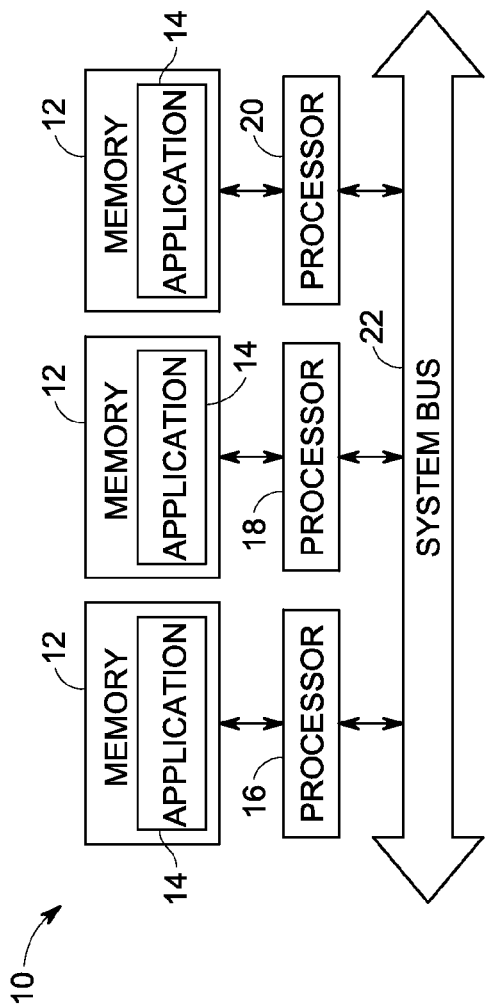
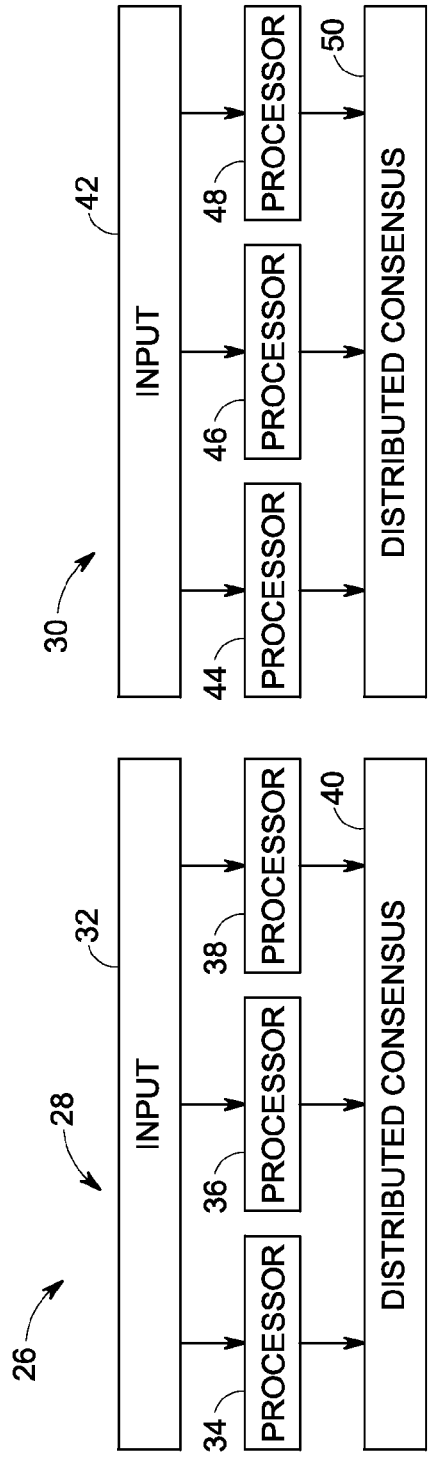

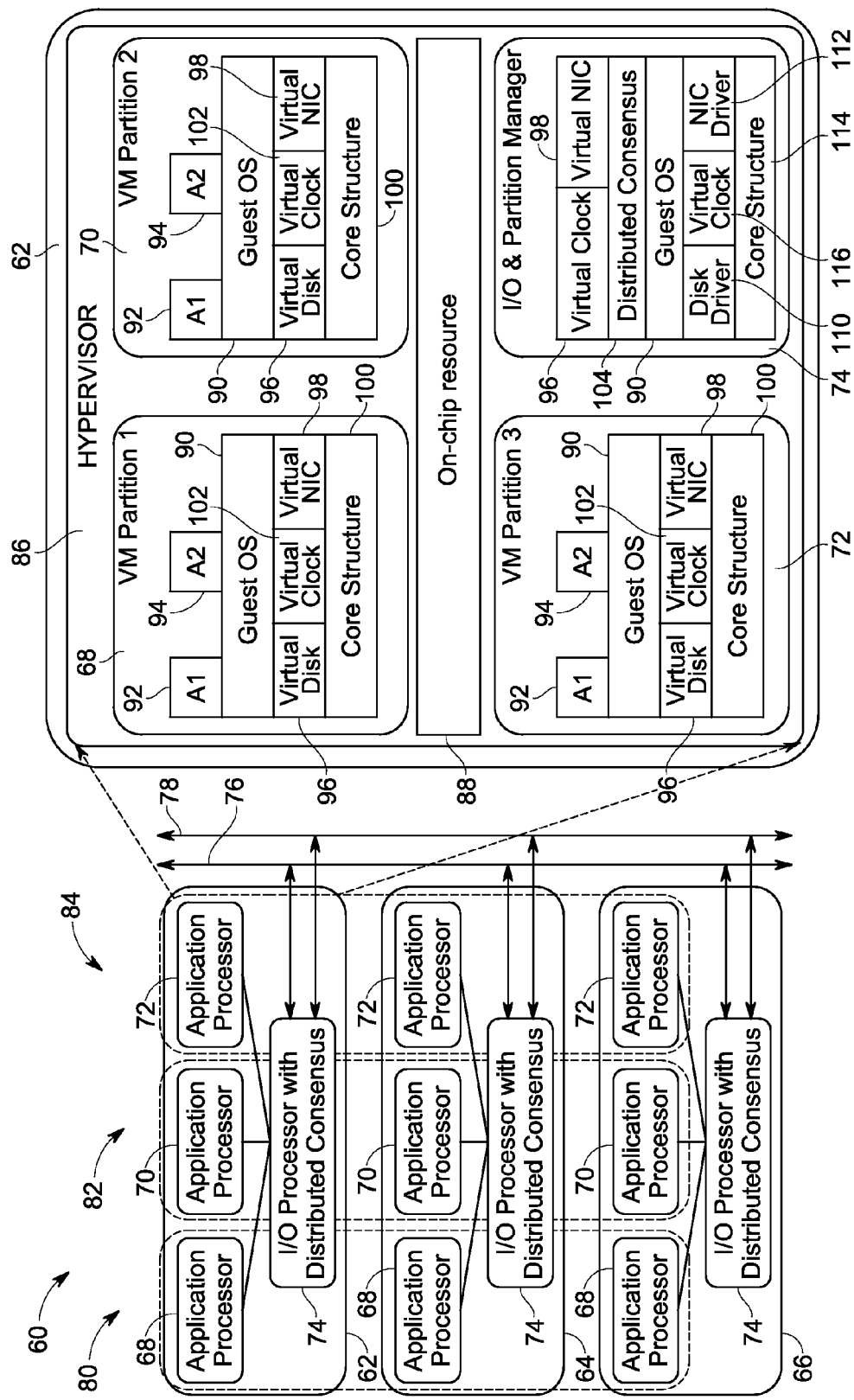

SYSTEM AND METHOD FOR SYNCHRONIZING PROCESSOR INSTRUCTION EXECUTION

BACKGROUND

The subject matter disclosed herein relates to processors and, more particularly, to a system and method for synchronizing processor instruction execution.

Processors (e.g., central processing units (CPUs), microprocessors, etc.) are used to execute instructions in a variety of different applications. For example, processors may be used to execute instructions in safety-critical and/or mission-critical applications that have high integrity, availability, and assurance requirements. Such applications may include avionics, rocketry, spacecraft, military use, nuclear power plants, and so forth. In such applications, two or more processors may be configured to execute a specific number of instructions within a specific amount of time. For example, two or more processors may be configured to operate in a synchronous manner so that the two or more processors begin and/or end operations at substantially the same time. Unfortunately, if the two or more processors do not begin and/or end operations at substantially the same time, the results from the two or more processors may be unreliable and/or unusable.

BRIEF DESCRIPTION

In accordance with one embodiment, a method for synchronizing a number of instructions performed by processors includes instructing a first processor to iteratively execute instructions via a first set of iterations until a predetermined time period has elapsed. A number of instructions executed in each iteration of the first set of iterations is less than a number of instructions executed in a prior iteration of the first set of iterations. The method also includes instructing a second processor to iteratively execute instructions via a second set of iterations until the predetermined time period has elapsed. A number of instructions executed in each iteration of the second set of iterations is less than a number of instructions executed in a prior iteration of the second set of iterations. The method includes determining a first total number of instructions executed by the first processor during the predetermined time period and determining a second total number of instructions executed by the second processor during the predetermined time period. The method also includes instructing the second processor to execute a first calculated number of instructions if the second total number of instructions is less than the first total number of instructions.

In accordance with another embodiment, a method includes receiving input data into a system, providing the input data to multiple processors, executing application code using the input data to produce a respective number of outputs from the processors, and applying a distributed consensus algorithm to the respective number of outputs to produce a consensus output. The processors include a first processor configured to iteratively execute instructions via a first set of iterations until a predetermined time period has elapsed. A number of instructions executed in each iteration of the first set of iterations is less than a number of instructions executed in a prior iteration of the first set of iterations. The processors also include a second processor configured to iteratively execute instructions via a second set of iterations until the predetermined time period has elapsed. A number of instructions executed in each iteration of the second set of iterations is less than a number of instructions executed in a prior iteration of the second set of iterations.

In accordance with a further embodiment, a system for synchronizing processors includes a first processor configured to iteratively execute instructions via a first set of iterations until a predetermined time period has elapsed. A number of instructions executed in each iteration of the first set of iterations is less than a number of instructions executed in a prior iteration of the first set of iterations. The system also includes a second processor configured to iteratively execute instructions via a second set of iterations until the predetermined time period has elapsed. A number of instructions executed in each iteration of the second set of iterations is less than a number of instructions executed in a prior iteration of the second set of iterations. The system includes a third processor configured to iteratively execute instructions via a third set of iterations until the predetermined time period has elapsed. A number of instructions executed in each iteration of the third set of iterations is less than a number of instructions executed in a prior iteration of the third set of iterations.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 1 is a block diagram of an embodiment of a high integrity system which may employ two or more synchronized processors;

FIG. 2 is a block diagram of another embodiment of a high integrity system which may employ two or more synchronized processors;

FIG. 3 is a block diagram of an embodiment of a high integrity system having a multi-core processor with a hypervisor to control the operation of multiple processors;

FIG. 4 is a diagram of the multi-core processor of FIG. 3;

DETAILED DESCRIPTION

Figure 5:
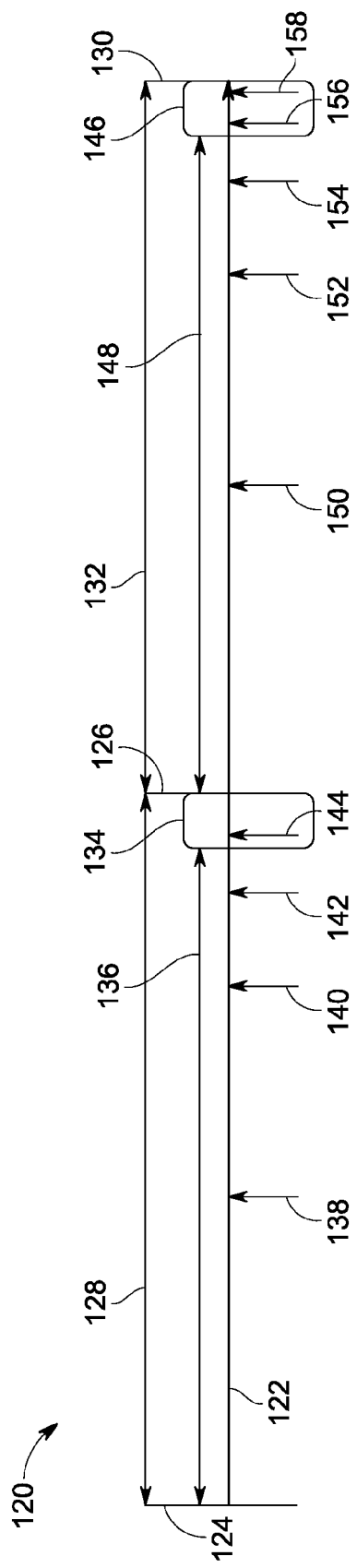
FIG. 5 is a timing diagram of an embodiment of a method for controlling instructions executed by a processor.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

FIG. 1 is a block diagram of an embodiment of a high integrity system 10 which may employ two or more synchronized processors. As may be appreciated, the high integrity system 10 may be a high-integrity (e.g., high likelihood of reaching a correct answer), high-availability (e.g., functioning system capable of delivering an answer), and/or high-assurance (e.g., confidence that the system is running the correct software) system. For example, the high-integrity system 10 may be designed with a failure in time (FIT) rate of less than approximately $1.0 \times 10^{-9}$ per hour (e.g., per flight hour). Certain embodiments may include three or more synchronized processors to provide a high-integrity and high-availability system. Accordingly, the high-integrity system 10 may be designed to be used in a real-time safety-critical avionics application (e.g., aircraft).

The high integrity system 10 includes memory 12 for holding an application 14. Furthermore, the application 14 is configured to provide executable instructions to one or more processors 16, 18, and 20. As may be appreciated, the application 14 for each of the processors 16, 18, and 20 is the same functional application and provides the executable instructions to the one or more processors 16, 18, and 20. Accordingly, the high integrity system 10 is designed so that the platform (e.g., processors 16, 18, and 20) provides the integrity and availability. In such a configuration, the platform may include a complex design, while the application 14 includes a simplified design. In certain embodiments, the application 14 may be designed to provide the integrity. In such a configuration, the platform may include a simple design, while the application 14 includes a complex design to provide the logic for high-integrity, high-availability, and high-assurance. As illustrated in the present embodiment, the processors 16, 18, and 20 provide results to a system bus 22. For example, results from executed instructions may be provided from the processors 16, 18, and 20 to the system bus 22.

Although only three processors 16, 18, and 20 are illustrated, the high integrity system 10 may include fewer or more processors. For example, in certain embodiments, five or six processors may be used in a design having a FIT rate of less than approximately $1.0 \times 10^{-11}$ per hour, with each processor having a FIT rate of approximately $1.0 \times 10^{-3}$. It should be noted that many assumptions and variables are used to calculate the FIT rate. As another example, six, seven, or eight processors may be used in a design having a FIT rate of less than approximately $1.0 \times 10^{-15}$ per hour. The processors 16, 18, and 20 may each receive the same input and may be designed to provide the same output. Accordingly, the output from the processors 16, 18, and 20 may be synchronized in real time to verify that the output from the processors 16, 18, and 20 is the same. With synchronized processors 16, 18, and 20, the high integrity system 10 may produce reliable results.

The reliable results produced by the synchronized processors 16, 18, and 20 may meet high integrity, availability, and assurance requirements. As such, the high integrity system 10 may be used for safety-critical and/or mission-critical applications. Accordingly, the high integrity system 10 may operate in an efficient and cost effective manner without using specialized hardware.

FIG. 2 is a block diagram of an embodiment of a high integrity system 26 which may employ two or more synchronized processors. The high integrity system 26 includes first replicated state machines 28 and second replicated state machines 30. The first replicated state machines 28 have an input 32 (e.g., input data) that is identically provided to each processor 34, 36, and 38. After executing instructions, the processors 34, 36, and 38 provide a synchronized output. Thereafter, the first replicated state machines 28 perform a distributed consensus 40 (e.g., algorithm) that results in a single output from the first replicated state machines 28. Furthermore, the second replicated state machines 30 have an input 42 (e.g., input data) that is identically provided to each processor 44, 46, and 48. In certain embodiments, the inputs 32 and 42 are the same. After executing instructions, the processors 44, 46, and 48 each provide a synchronized output. Thereafter, the second replicated state machines 30 perform a distributed consensus 50 (e.g., algorithm) that results in a single output from the second replicated state machines 30.

The output from the first and second replicated state machines 28 and 30 provide a redundancy that facilitates either the distributed consensus 40 or the distributed consensus 50 being used. For example, if the distributed consensus 40 of the first replicated state machine 28 determines an answer, then that answer is used. However, if the distributed consensus 40 of the first replicated state machine 28 does not determine an answer, an answer from the distributed consensus 50 of the second replicated state machine 30 is used. Thus, the redundancy of the first and second replicated state machines 28 and 30 facilitates enhanced availability. It should be noted that using the present embodiment, a FIT rate of less than approximately $1.0 \times 10^{-15}$ per hour may be obtained.

As may be appreciated, the high integrity system 26 may use any suitable algorithm for distributed consensus. For example, the high integrity system 26 may use basic paxos, multi-paxos, cheap paxos, fast paxos, generalized paxos, byzantine multi-paxos, fast byzantine multi-paxos, storage-less paxos, coping paxos, one-correct paxos, fast paxos B, information theoretic byzantine paxos, Chandra-Toueg (CT), Mostefaoui-Raynal (MR), query update (Q/U), hybrid-quorum (HQ), zyzzyva, aardvark, upright, Brooks-Iyengar, practical byzantine fault tolerance (PBFT), and/or aliph, among others.

As described above, the processors 34, 36, and 38 may each provide a synchronized output. Furthermore, the processors 44, 46, and 48 may each provide a synchronized output. As may be appreciated, the processors may be synchronized in any suitable manner that provides real time synchronization. Accordingly, the distributed consensuses 40 and 50 of the high integrity system 26 may provide reliable and/or usable results.

FIG. 3 is a block diagram of an embodiment of a high integrity system 60 having a first multi-core processor 62 with a hypervisor to control the operation of multiple processors. The high integrity system 60 includes the first multi-core processor 62, a second multi-core processor 64, and a third multi-core processor 66. Although multi-core processors are described herein, the high integrity system 60 may include processors with any suitable number of cores (e.g., 1, 2, 4, 8, 16, etc.). Furthermore, each of the multi-core processors 62, 64, and 66 includes application processors 68, 70, and 72 to execute instructions, and an I/O processor 74 configured to control instruction execution of the application processors 68, 70, and 72, and to execute a distributed consensus algorithm. The multi-core processors 62, 64, and 66 communicate with each other and with external devices using system busses 76 and 78. Although two system busses 76 and 78 are illustrated, the high integrity system 60 may include any suitable number of busses (e.g., 1, 2, 4, etc.). As illustrated, the application processors 68 from each of the multi-core processors 62, 64, and 66 may form a replicated state machine 80. Furthermore, the application processors 70 from each of the multi-core processors 62, 64, and 66 may form a replicated state machine 82. Moreover, the application processors 72 from each of the multi-core processors 62, 64, and 66 may form a replicated state machine 84. In certain embodiments, the number of processor cores allocated from the multi-core processors 62, 64, and 66 may vary, such that fewer than the total available number of processor cores may be allocated, a different number of processor cores may be allocated from each of the multi-core processors 62, 64, and 66, and so forth. In certain embodiments, a high integrity application may use integrity checking, but not high-availability and may allocate only two processor cores to the high integrity application. In other embodiments, the high integrity application may achieve high-availability by allocating more than three processor cores from each multi-core processor 62, 64, and 66 to the high integrity application.

FIG. 4 further illustrates a diagram of the first multi-core processor 62. It should be noted that the second multi-core processor 64 and the third multi-core processor 66 may include the same as the first multi-core processor 62. As illustrated, the first multi-core processor 62 includes a hypervisor 86 (e.g., virtual machine manager (VMM)). In the present embodiment, the hypervisor 86 is a type one hypervisor; however, in other embodiments, any suitable hypervisor (e.g., type two) may be used. As may be appreciated, a type one hypervisor may be a hypervisor that runs directly on a host's hardware to control the hardware and manage guest operating systems (e.g., VMware vSphere, Oracle VM Server for SPARC, the Citrix XenServer, KVM, Microsoft Hyper-V hypervisor, and so forth). Furthermore, a type two hypervisor may be a hypervisor that runs within a conventional operating system environment (e.g., BHyVe, VMware Workstation, VirtualBox). For embedded real-time systems, the hypervisor technology may be based on a separation kernel used in a MILS RTOS or a ARINC-653 RTOS (e.g., Green Hills INTEGRITY and INTEGRITY-178, Wind River VxWorks MILS and 653, LynuxWorks LynxSecure and LynxOS-178, etc.). The first multi-core processor 62 also includes on-chip resources 88 that may be provided to the processors 68, 70, 72, and 74. For example, the on-chip resources 88 may include network resources, partitioning resources, security resources, and so forth.

The application processor 68 (VM Partition 1), the application processor 70 (VM Partition 2), and the application processor 72 (VM Partition 3) may each be configured in a similar fashion. Accordingly, the application processors 68, 70, and 72 each operate using a guest operating system (guest OS) 90 (e.g., Linux, Windows, an embedded RTOS, etc.) that interacts with the hypervisor 86 to access the hardware of the first multi-core processor 62. In certain embodiments, the application processors 68, 70, and 72 may each operate using a "bare metal" environment (e.g., Ada run time) instead of the guest OS 90. Moreover, one or more applications 92 and 94 may be executed by the guest OS 90 to execute instructions provided to the guest OS 90. The application processors 68, 70, and 72 may include "clients," such as a virtual disk client 96 and a virtual network interface card (NIC) client 98 that are configured to access corresponding "servers" (e.g., drivers). Furthermore, the application processors 68, 70, and 72 each include a core structure 100 (e.g., a retired instruction counter (RIC) and clock) that are real functions implemented in the processors 68, 70, and 72. In addition, the application processors 68, 70, and 72 also may include a virtual clock client 102 that is used to access a virtual clock server.

As illustrated, the I/O processor 74 also includes the guest OS 90, the virtual disk 96, and the virtual NIC 98. Furthermore, the I/O processor 74 is configured to execute a distributed consensus algorithm 104. The I/O processor 74 also includes a disk driver 110 that acts as a server for providing access to disk resources (e.g., via virtual disk clients 96), and a network interface card (NIC) driver 112 that acts as a server for providing access to the network (e.g., via NIC clients 98). The I/O processor 74 is configured to perform distributed consensus logic across the other processors 68, 70, and 72. Moreover, the I/O processor 74 includes a core structure 114 (e.g., a retired instruction counter (RIC), clock, NIC, and disk). Furthermore, the processor 74 includes a virtual clock server 116 for providing a virtual clock to virtual clock clients 102 to facilitate synchronization between processors 68, 70, and 72 (e.g., processing lanes). Accordingly, the I/O processor 74 is configured to interface between the application processors 68, 70, and 72 and other hardware thereby enabling the application processors 68, 70, and 72 to receive and execute instructions. Furthermore, as illustrated, each of the processors 68, 70, 72, and 74 includes a guest OS 90 so the processors can perform operations independently. It should be noted that the application processors 68, 70, and 72 may be configured to operate as replicated state machines without hidden variables (e.g., information added to data being processed). For example, the application processors 68, 70, and 72 may be configured to operate such that information may be received (e.g., input data), instructions may be executed, and a result output in the same manner (e.g., the results are the same) from any of the application processors 68, 70, and 72. Accordingly, with the same input provided to the application processors 68, 70, and 72, the same output may be obtained. Furthermore, the outputs may be synchronized so that the application processors 68, 70, and 72 start and/or end processing at synchronized time intervals, resulting in identical (e.g., consistent) results without observable differences.

FIG. 5 is a timing diagram 120 of an embodiment of a method for controlling instructions executed by a processor. As illustrated, the instructions are executed along a timeline 122. A first time synchronization signal 124 (e.g., clock signal) is illustrated at the left-hand side of the timeline 122. Furthermore, a second time synchronization signal 126 is illustrated toward a central portion of the timeline 122. A duration 128 is the time between the first time synchronization signal 124 and the second time synchronization signal 126. As may be appreciated, the duration 128 may be any suitable duration. For example, in certain embodiments, the duration 128 may be approximately 250 μs+/−10 μs. Moreover, a third time synchronization signal 130 is illustrated at the right-hand side of the timeline 122. A duration 132 is the difference in time between the second time synchronization signal 126 and the third time synchronization signal 130, and is generally the same as the duration 128. As may be appreciated, the same pattern illustrated in the timing diagram 120 may be repeated during operation of a processor. Accordingly, the duration between any two synchronization signals may be any suitable time based on the processor, application, clock, timing, and so forth (e.g., approximately 250 μs+/−10 μs).

In certain embodiments, it may be desirable to maximize a number of instructions executed by a processor between time synchronization signals without executing instructions while the time synchronization signals occur. Accordingly, it may be desirable to stop executing instructions within a time window 134 before the second time synchronization signal 126. Moreover, a duration 136 (e.g., predetermined time period) illustrates a total time between the first time synchronization signal 124 and a starting time of the time window 134. It should be noted that the duration 136 is less than the duration 128. In certain embodiments, the duration 136 may be approximately 230 μs, and the duration of the time window 134 may be approximately 20 μs.

In some embodiments, a total number of instructions executed by a processor may be controlled. In one example, the number of instructions executed by the processor may follow a geometric progression where the number of instructions executed in each iteration is roughly half the number of instructions executed in the previous iteration. For example, an estimated total number of instructions that the processor executes during the duration 136 may be calculated (e.g., based at least partly on the duration 136). During a first iteration of the method for controlling instructions executed by the processor (e.g., processor 68, 70, 72), approximately half of the estimated total number of instructions may be executed. For example, between the first time synchronization signal 124 and a time 138, approximately half of the estimated total number of instructions may be executed. Thereafter, the processor (e.g., processor 68, 70, 72) may be instructed (e.g., by the processor 74) to iteratively execute a number of instructions during a current iteration that is less than an earlier number of instructions executed in a prior iteration until the duration 136 has elapsed. For example, between the time 138 and a time 140, the processor may be instructed to execute approximately half of the instructions executed between the first time synchronization signal 124 and the time 138. Furthermore, between the time 140 and a time 142, the processor may be instructed to execute approximately half of the instructions executed between the time 138 and the time 140. As illustrated, the time 142 is not within the time window 134. Accordingly, between the time 142 and a time 144, the processor may be instructed to execute approximately half of the instructions executed between the time 140 and the time 142. The time 144 is within the time window 134, therefore, the duration 136 has elapsed. As may be appreciated, the processor may send an indication (e.g., a fingerprint, a message to other processors, a determination of additional instructions to execute, generation of a timer interrupt, etc.) after each iteration is complete.

The total number of instructions executed during the duration 136 may be determined in any suitable manner. For example, the total number of instructions executed during the duration 136 may be determined by summing (i.e., adding) the number of instructions executed between the first time synchronization signal 124 and the time 144. As another example, the total number of instructions executed during the duration 136 may be determined by accessing (e.g., reading) a count from a retired instruction counter (RIC).

In certain embodiments, the total number of instructions executed during the duration 136 may be less than desired. Accordingly, the processor may be instructed to execute a calculated number of instructions after the duration 136 has elapsed. In contrast, if the total number of instructions executed during the duration 136 is greater than or equal to a desired total number of instructions, the processor may delay processing during a time period after the duration 136.

Again, during the duration 132 after the second time synchronization signal 126, a time window 146 may be disposed before the third time synchronization signal 130. It may be desirable to stop executing instructions within the time window 146 to control the number of instructions executed before the third time synchronization signal 130. Moreover, a duration 148 (e.g., predetermined time period) illustrates a total time between the second time synchronization signal 126 and a starting time of the time window 146. It should be noted that the duration 148 is less than the duration 132.

Likewise, the total number of instructions executed by a processor may again be controlled. For example, an estimated total number of instructions that the processor is expected to execute during the duration 148 may be calculated (e.g., based at least partly on the duration 148). During a first iteration of the method for controlling instructions executed by the processor after the second time synchronization signal 126, approximately half of the estimated total number of instructions may be executed. For example, between the second time synchronization signal 126 and a time 150, approximately half of the estimated total number of instructions may be executed. The processor may be instructed to iteratively execute a number of instructions during a current iteration that is less than an earlier number of instructions executed in a prior iteration until the duration 148 has elapsed. For example, between the time 150 and a time 152, the processor may be instructed to execute approximately half of the instructions executed between the second time synchronization signal 126 and the time 150. Furthermore, between the time 152 and a time 154, the processor may be instructed to execute approximately half of the instructions executed between the time 150 and the time 152. As illustrated, the time 154 is not within the time window 146. Accordingly, between the time 154 and a time 156, the processor may be instructed to execute approximately half of the instructions executed between the time 152 and the time 154. The time 156 is within the time window 146, therefore, the duration 148 has elapsed. As may be appreciated, the processor may send an indication and perform additional logic to synchronize retired instruction counts (RICs) between replicated processors after each iteration is complete.

Again, the total number of instructions executed during the duration 148 may be determined in any suitable manner. For example, the total number of instructions executed during the duration 148 may be determined by summing the number of instructions executed between the second time synchronization signal 126 and the time 156. As another example, the total number of instructions executed during the duration 148 may be determined by accessing a count from a RIC.

In certain embodiments, the total number of instructions executed during the duration 148 may be less than desired. Accordingly, the processor may be instructed to execute a calculated number of instructions after the duration 148 has elapsed. For example, the processor may be instructed to execute the calculated number of instructions between the time 156 and a time 158. In contrast, if the total number of instructions executed during the duration 148 is greater than or equal to a desired total number of instructions, the processor may delay processing during a time period after the duration 148.

The timing diagram 120 may also be used to illustrate another embodiment. For example, the number of instructions executed by the processor may be calculated based on a remaining time duration. For example, an estimated total number of instructions that the processor executes during the duration 136 may be calculated based on the duration 136. During a first iteration of the method for controlling instructions executed by the processor (e.g., processor 68, 70, 72), half of the estimated total number of instructions may be executed. For example, at the first time synchronization signal 124, half of the estimated total number of instructions may be executed. Thereafter, the processor (e.g., processor 68, 70, 72) may be instructed (e.g., by the processor 74) to execute an estimated number of instructions based on half of the remaining time of the duration 136. Furthermore, at the time 140, the processor may be instructed to execute an estimated number of instructions based on half of the remaining time of the duration 136. As illustrated, the time 142 is not within the time window 134. Accordingly, at the time 142, the processor may be instructed to execute an estimated number of instructions based on half of the remaining time of the duration 136. The time 144 is within the time window 134, therefore, the duration 136 has elapsed. As may be appreciated, the processor may synchronize with other processors after it has entered the time window 134. To synchronize with other processors, a fingerprint of the processor may be compared with a fingerprint of another processor. A total time period during which the number of instructions was executed may be determined as previously discussed. In certain embodiments, the processor may be instructed to execute a second number of instructions after the duration 136 has elapsed if the total time period is less than a predetermined time period. Furthermore, in some embodiments, the processor may be instructed to delay processing after the duration 136. Using the methods described above, a processor may be controlled to execute a certain number of instructions within a certain period of time. Accordingly, the number of instructions executed within a time period may be optimized (e.g., maximized). Furthermore, multiple processors may be controlled together to synchronize the processors.

Figure 6:
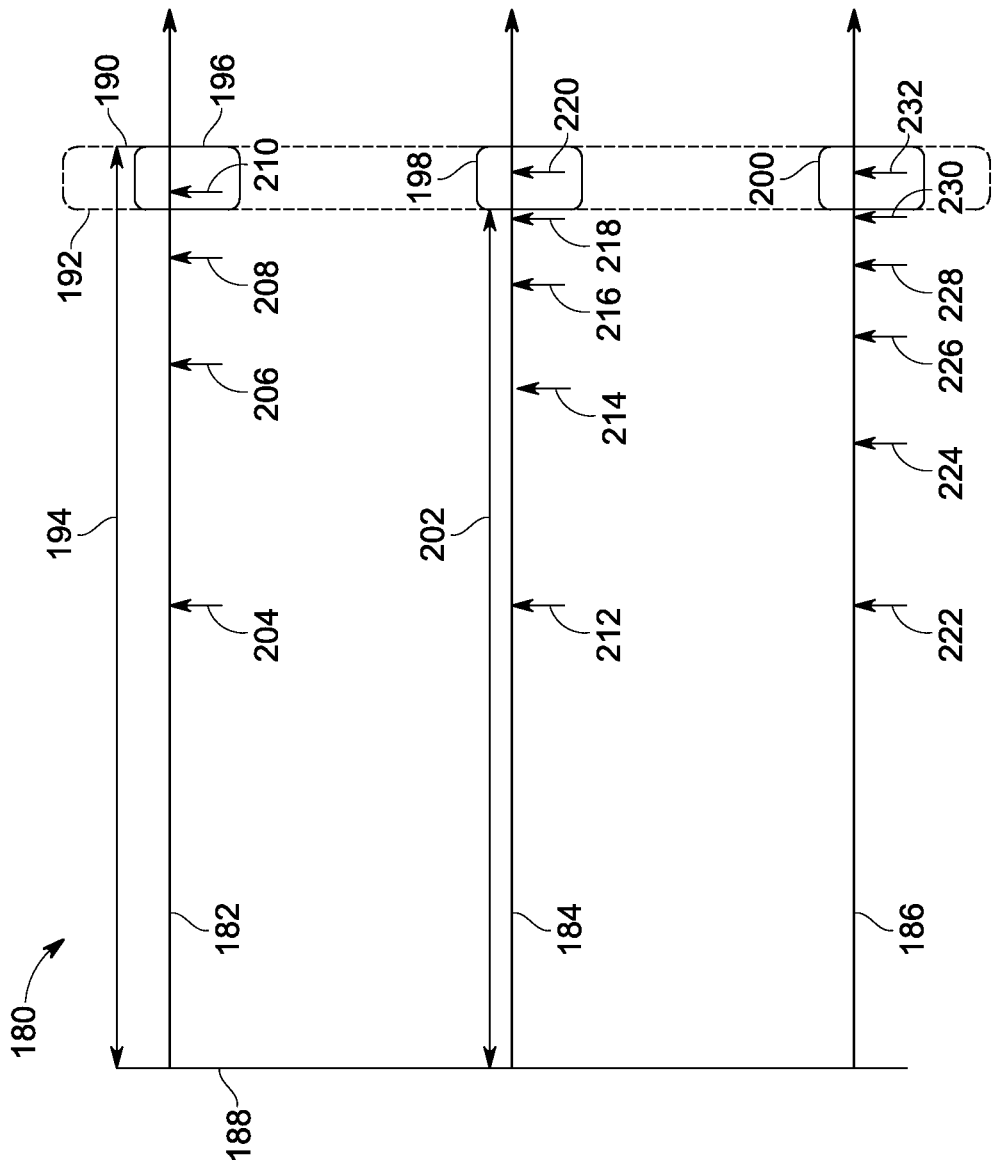
FIG. 6 is a timing diagram of an embodiment of a method for synchronizing multiple processors.

FIG. 6 is a timing diagram 180 of an embodiment of a method for synchronizing multiple processors. Accordingly, the operation of a first processor is illustrated along a timeline 182, the operation of a second processor is illustrated along a timeline 184, and the operation of a third processor is illustrated along a timeline 186. Furthermore, a first time synchronization signal 188 (e.g., clock signal) is illustrated at the left-hand side of the timelines 182, 184, and 186. Moreover, a second time synchronization signal 190 is illustrated at the right-hand side of the timelines 182, 184, and 186. In addition, toward the right-hand side of the timelines 182, 184, and 186 is a time segment 192 where the synchronization of the first, second, and third processors is verified and/or corrected so that the processors are synchronized when the second time synchronization signal 190 is received.

A duration 194 is the time between the first time synchronization signal 188 and the second time synchronization signal 190. As may be appreciated, the duration 194 may be any suitable duration. For example, in certain embodiment, the duration 194 may be approximately 250 μs+/−10 μs. As may be appreciated, the same pattern illustrated in the timing diagram 180 may be repeated as often as necessary (e.g., between each time synchronization signal) during operation of the processors. Accordingly, the duration between two consecutive synchronization signals may be any suitable time, such as a time based on the processor, application, clock, timing, and so forth (e.g., approximately 250 μs+/−10 μs).

In certain embodiments, it may be desirable to maximize a number of instructions executed by the processors between time synchronization signals, and to synchronize the processors with one another. Accordingly, to synchronize the processors, it may be desirable to stop executing instructions on each processor within time windows 196, 198, and 200 before the second time synchronization signal 190. Moreover, a duration 202 (e.g., predetermined time period) illustrates a total time between the first time synchronization signal 188 and a starting time of the time windows 196, 198, and 200. It should be noted that the duration 202 is less than the duration 194. In certain embodiments, the duration 202 may be approximately 230 μs, and the duration of each of the time windows 196, 198, and 200 may be approximately 20 μs.

In some embodiments, a total number of instructions executed by a processor may be controlled. For example, an estimated total number of instructions that each of the processors executes during the duration 202 may be calculated (e.g., based at least partly on the duration 202). As discussed above, the number of instructions executed during each iteration may be determined using any suitable method. For example, the number of instructions may be based on a geometric progression (e.g., approximately half of a previous number of instructions), a remaining time (e.g., half of the remaining time windows), and so forth. During a first iteration of the method for controlling instructions executed by the first processor, approximately half of the estimated total number of instructions may be executed. For example, between the first time synchronization signal 188 and a time 204, approximately half of the estimated total number of instructions may be executed. Thereafter, the first processor may be instructed to iteratively execute a number of instructions during a current iteration that is less than an earlier number of instructions executed in a prior iteration until the duration 202 has elapsed. For example, between the time 204 and a time 206 (e.g., during a second iteration), the first processor may be instructed to execute approximately half of the instructions executed between the first time synchronization signal 188 and the time 204. Furthermore, between the time 206 and a time 208 (e.g., during a third iteration), the first processor may be instructed to execute approximately half of the instructions executed between the time 204 and the time 206. As illustrated, the time 208 is not within the time window 196. Accordingly, between the time 208 and a time 210, the first processor may be instructed to perform a fourth iteration by executing approximately half of the instructions executed between the time 206 and the time 208. As illustrated, the time 210 is within the time window 196; therefore, the duration 202 has elapsed after four iterations were performed. As may be appreciated, the first processor may send an indication (e.g., a fingerprint, a message to other processors, a determination of additional instructions to execute, generation of a timer interrupt, etc.) after each iteration is complete. Furthermore, the first processor may send a fingerprint (e.g., RIC, memory load count, memory store count, branch instructions count, data loads and stores, branches taken, and so forth) after each iteration is complete.

The second processor may also be controlled to stop executing instructions after the duration 202 has elapsed. For example, during a first iteration of the method for controlling instructions executed by the second processor, approximately half of the estimated total number of instructions may be executed. Specifically, between the first time synchronization signal 188 and a time 212, approximately half of the estimated total number of instructions may be executed. Thereafter, the second processor may be instructed to iteratively execute a number of instructions during a current iteration that is less than an earlier number of instructions executed in a prior iteration until the duration 202 has elapsed. For example, between the time 212 and a time 214 (e.g., during a second iteration), the second processor may be instructed to execute approximately half of the instructions executed between the first time synchronization signal 188 and the time 212. Furthermore, between the time 214 and a time 216 (e.g., during a third iteration), the second processor may be instructed to execute approximately half of the instructions executed between the time 212 and the time 214. Moreover, between the time 216 and a time 218 (e.g., during a fourth iteration), the second processor may be instructed to execute approximately half of the instructions executed between the time 214 and the time 216. As illustrated, the time 218 is not within the time window 198. Accordingly, between the time 218 and a time 220, the second processor may be instructed to perform a fifth iteration by executing approximately half of the instructions executed between the time 216 and the time 218. As illustrated, the time 220 is within the time window 198; therefore, the duration 202 has elapsed after five iterations were performed. Similar to the first processor, the second processor may send an indication (a fingerprint, a message to other processors, a determination of additional instructions to execute, generation of a timer interrupt, etc.) after each iteration is complete.

The third processor may also be controlled to stop executing instructions after the duration 202 has elapsed. For example, during a first iteration of the method for controlling instructions executed by the third processor, approximately half of the estimated total number of instructions may be executed. Specifically, between the first time synchronization signal 188 and a time 222, approximately half of the estimated total number of instructions may be executed. Thereafter, the third processor may be instructed to iteratively execute a number of instructions during a current iteration that is less than an earlier number of instructions executed in a prior iteration until the duration 202 has elapsed. For example, between the time 222 and a time 224 (e.g., during a second iteration), the third processor may be instructed to execute approximately half of the instructions executed between the first time synchronization signal 188 and the time 222. Furthermore, between the time 224 and a time 226 (e.g., during a third iteration), the third processor may be instructed to execute approximately half of the instructions executed between the time 222 and the time 224. Moreover, between the time 226 and a time 228 (e.g., during a fourth iteration), the third processor may be instructed to execute approximately half of the instructions executed between the time 224 and the time 226. In addition, between the time 228 and a time 230 (e.g., during a fifth iteration), the third processor may be instructed to execute approximately half of the instructions executed between the time 226 and the time 228. As illustrated, the time 230 is not within the time window 200. Accordingly, between the time 230 and a time 232, the third processor may be instructed to perform a sixth iteration by executing approximately half of the instructions executed between the time 228 and the time 230. As illustrated, the time 232 is within the time window 200; therefore, the duration 202 has elapsed after six iterations were performed. Similar to the first and second processors, the third processor may send an indication and/or a fingerprint after each iteration is complete.

The total number of instructions executed by the first, second, and/or third processors during the duration 202 may be determined in any suitable manner. For example, the total number of instructions executed during the duration 202 may be determined by summing (e.g., adding) the number of instructions executed between the first time synchronization signal 188 and the time at the end of the last iteration (e.g., times 210, 220, 232). As another example, the total number of instructions executed during the duration 202 may be determined by accessing (e.g., reading) a count from the RIC.

In certain embodiments, the total number of instructions executed by the first, second, and third processors during the duration 202 may be less than desired. Accordingly, the processors may be instructed to execute a calculated number of instructions after the duration 202 has elapsed. In contrast, if the total number of instructions executed during the duration 202 is greater than or equal to a desired total number of instructions, the processors may delay processing during a time period after the duration 202.

For example, as described above, during the duration 202 the first processor began four iterations, the second processor began five iterations, and the third processor began six iterations. For purposes of this illustration the first, second, and third processors may be 1.0 GHz processors capable of executing two billion instructions per second. Further, for this illustration, the processors are configured to operate using the geometric approach as described above. Therefore, an estimated total number of instructions to be executed during the duration 202 (e.g., 230 µs) may be approximately 460,000 instructions (e.g., 2,000,000,000×230 µs). Accordingly, during a first iteration approximately one half of the total number of instructions may be executed; therefore, during the first iteration approximately 230,000 instructions may be executed. Furthermore, during each succeeding iteration approximately half of the instructions executed in the prior iteration may be executed. As such, during the second iteration approximately 115,000 instructions may be executed. Moreover, during the third iteration approximately 57,500 instructions may be executed. Furthermore, during the fourth iteration approximately 28,750 instructions may be executed. During the fifth iteration approximately 14,375 instructions may be executed, and during the sixth iteration approximately 7,188 instructions may be executed. As may be appreciated, the fingerprint of each processor should match after each iteration is complete.

Therefore, the first processor may execute approximately 431,250 instructions (e.g., 230,000+115,000+57,500+28,750) by the time the iterations of the first processor stop within the window 196 (e.g., after the fourth iteration). Furthermore, the second processor may execute approximately 445,625 instructions (e.g., 230,000+115,000+57,500+28,750+14,375) by the time the iterations of the second processor stop within the window 198 (e.g., after the fifth iteration). Moreover, the third processor may execute approximately 452,813 instructions (e.g., 230,000+115,000+57,500+28,750+14,375+7,188) by the time the iterations of the third processor stop within the window 200 (e.g., after the sixth iteration). It should be noted that the first, second, and third processors may execute a different number of instructions based on any number of variables, such as variations in performance of the processors over the given time period.

As such, each of the first, second, and third processors may not be synchronized (e.g., may not have performed the same number of instructions). Accordingly, the first processor may execute approximately 21,563 instructions (e.g., 14,375+7,188) to catch up to the third processor. Furthermore, the second processor may execute approximately 7,188 instructions to catch up to the third processor. Therefore, during the time windows 196 and 198, the first and second processors may be instructed to execute the additional instructions so that by the end of the time windows 196 and 198 the first and second processors have completed the same number of instructions as the third processor. Moreover, the third processor may be delayed during the remainder of the time window 200 to allow the first and second processors time to execute the instructions. It should be noted that the first and/or second processors may begin executing additional instructions before the third processor finishes its sixth iteration so that there is sufficient time to execute the instructions.

As another example, again during the duration 202 the first processor began four iterations, the second processor began five iterations, and the third processor began six iterations. Likewise, for purposes of this illustration the first, second, and third processors may be 1.0 GHz processors capable of executing two billion instructions per second. Further, for this illustration, the processors are configured to operate using based on a remaining time as described above. Therefore, an estimated total number of instructions to be executed during the duration 202 (e.g., 230 µs) may be approximately 460,000 instructions (e.g., 2,000,000,000×230 µs). Accordingly, during a first iteration instructions for approximately one half of the total duration may be executed; therefore, during the first iteration approximately 230,000 instructions may be executed by each processor (e.g., 2,000,000,000×115 µs). Furthermore, during each succeeding iteration each of the processors may execute instructions based on their respective remaining time.

As such, during the second iteration, the first processor may determine that it has approximately 108 µs remaining; therefore the first processor may execute approximately 108,000 instructions (e.g., 2,000,000,000×54 µs) to execute instructions for approximately half of the remaining time. Moreover, during the third iteration, the first processor may determine that it has approximately 52 µs remaining; therefore the first processor may execute approximately 52,000 instructions (e.g., 2,000,000,000×26 µs) to execute instructions for approximately half of the remaining time. In addition, during the fourth iteration, the first processor may determine that it has approximately 24 µs remaining; therefore the first processor may execute approximately 24,000 instructions (e.g., 2,000,000,000×12 µs) to execute instructions for approximately half of the remaining time. Accordingly, the first processor may execute approximately 414,000 instructions (e.g., 230,000+108,000+52,000+24,000) by the time the iterations for the first processor stop within the window 196.

Turning to the second processor, during the second iteration, the second processor may determine that it has approximately 110 µs remaining; therefore the second processor may execute approximately 110,000 instructions (e.g., 2,000,000,000×55 µs) to execute instructions for approximately half of the remaining time. Moreover, during the third iteration, the second processor may determine that it has approximately 54 µs remaining; therefore the second processor may execute approximately 54,000 instructions (e.g., 2,000,000,000×27 µs) to execute instructions for approximately half of the remaining time. In addition, during the fourth iteration, the second processor may determine that it has approximately 24 µs remaining; therefore the second processor may execute approximately 24,000 instructions (e.g., 2,000,000,000×12 µs) to execute instructions for approximately half of the remaining time. Furthermore, during the fifth iteration, the second processor may determine that it has approximately 10 µs remaining; therefore the second processor may execute approximately 10,000 instructions (e.g., 2,000,000,000×5 µs) to execute instructions for approximately half of the remaining time. Accordingly, the second processor may execute approximately 428,000 instructions (e.g., 230,000+110,000+54,000+24,000+10,000) by the time the iterations for the second processor stop within the window 198.

Turning to the third processor, during the second iteration, the third processor may determine that it has approximately 114 µs remaining; therefore the third processor may execute approximately 114,000 instructions (e.g., 2,000,000,000×57 µs) to execute instructions for approximately half of the remaining time. Moreover, during the third iteration, the third processor may determine that it has approximately 58 µs remaining; therefore the third processor may execute approximately 58,000 instructions (e.g., 2,000,000,000×29 µs) to execute instructions for approximately half of the remaining time. In addition, during the fourth iteration, the third processor may determine that it has approximately 28 µs remaining; therefore the third processor may execute approximately 28,000 instructions (e.g., 2,000,000,000×14 µs) to execute instructions for approximately half of the remaining time. Furthermore, during the fifth iteration, the third processor may determine that it has approximately 14 µs remaining; therefore the third processor may execute approximately 14,000 instructions (e.g., 2,000,000,000×7 µs) to execute instructions for approximately half of the remaining time. Moreover, during the sixth iteration, the third processor may determine that it has approximately 6 µs remaining; therefore the third processor may execute approximately 6,000 instructions (e.g., 2,000,000,000×3 µs) to execute instructions for approximately half of the remaining time. Accordingly, the third processor may execute approximately 450,000 instructions (e.g., 230,000+114,000+58,000+28,000+14,000+6,000) by the time the iterations for the third processor stop within the window 200. As may be appreciated, the fingerprint of each processor may not match after each iteration is complete.

As such, each of the first, second, and third processors may not be synchronized (e.g., may not have performed the same number of instructions). Accordingly, the first processor may execute approximately 36,000 instructions (e.g., 450,000–414,000) to catch up to the third processor. Furthermore, the second processor may execute approximately 22,000 (e.g., 450,000–428,000) instructions to catch up to the third processor. Therefore, during the time windows 196 and 198, the first and second processors may be instructed to execute the additional instructions so that by the end of the time windows 196 and 198 the first and second processors have completed the same number of instructions as the third processor. Moreover, the third processor may be delayed during the remainder of the time window 200 to allow the first and second processors time to execute the instructions. It should be noted that the first and/or second processors may begin executing additional instructions before the third processor finishes its sixth iteration so that there is sufficient time to execute the instructions. After the processors are synchronized, the fingerprints of each processor should match. For example, the retired instruction counts (RICs) should match.

Figure 7:
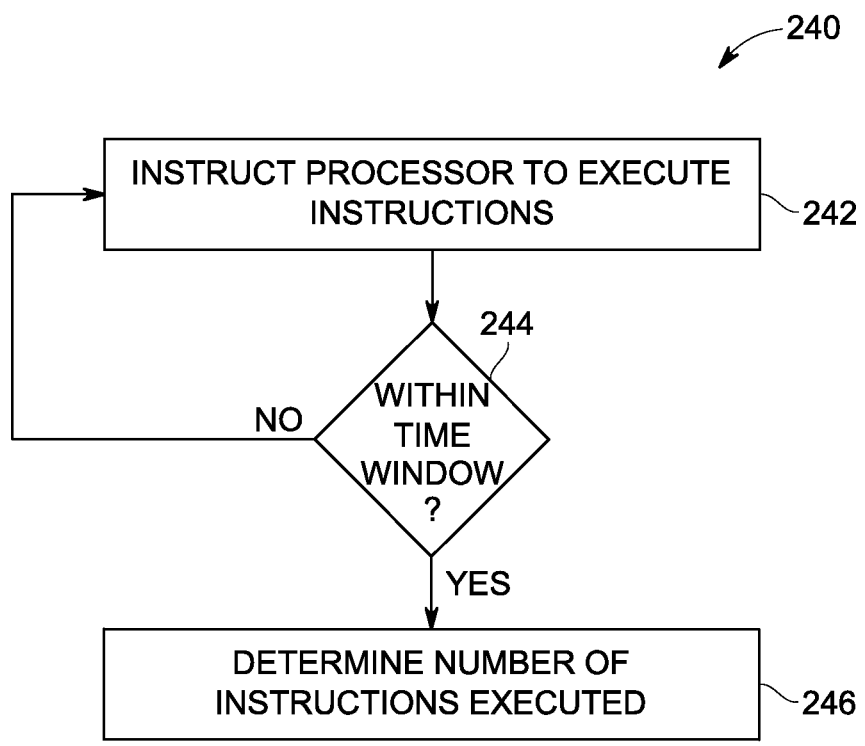
FIG. 7 is a flow chart of an embodiment of a method for controlling instructions executed by a processor.

FIG. 7 is a flow chart of an embodiment of a method 240 for controlling instructions executed by a processor (e.g., processor 68, 70, 72). The processor is instructed to execute instructions (block 242). For example, the processor may be instructed by another processor to execute a number of instructions based on a time period for execution, or based on a predetermined number of instructions. In one embodiment, the processor may be instructed to execute instructions that correspond to approximately half of the instructions anticipated to be executed between a current time and a beginning of a time window (e.g., time window 134, 146) in the future where it is desired to stop execution of instructions. After the processor has executed the instructions, a determination is made concerning whether the current time is within the time window (block 244). If the current time is not within the time window, the method returns to block 242 where the processor is instructed to execute additional instructions. As may be appreciated, the number of instructions executed during each iteration may be greater than the number of instructions in each succeeding iteration. Returning to block 244, if the current time is within the time window a total number of instructions executed are determined (block 246).

Technical effects of the invention include being able to control a number of instructions executed between time synchronization signals on a single processor. Furthermore, in a system with multiple processors, the processors may be controlled so that each processor executes the same number of instructions between consecutive synchronization signals. Accordingly, the processors may be synchronized and may be suitable for use in a high-integrity and/or high-availability system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for synchronizing a number of instructions performed by a plurality of processors, comprising:
   instructing a first processor to iteratively execute instructions via a first plurality of iterations until a predetermined time period has elapsed, wherein a number of instructions executed in each iteration of the first plurality of iterations is less than a number of instructions executed in a prior iteration of the first plurality of iterations;
   instructing a second processor synchronized with the first processor to iteratively execute instructions via a second plurality of iterations until the predetermined time period has elapsed, wherein a number of instructions executed in each iteration of the second plurality of iterations is less than a number of instructions executed in a prior iteration of the second plurality of iterations;
   determining a first total number of instructions executed by the first processor during the predetermined time period;
   determining a second total number of instructions executed by the second processor during the predetermined time period;
   instructing the second processor to execute a first calculated number of instructions if the second total number of instructions is less than the first total number of instructions; and
   instructing the first processor to execute a second calculated number of instructions if the first total number of instructions is less than the second total number of instructions.

2. The method of claim 1, comprising instructing the first processor to delay processing if the first total number of instructions is greater than or equal to the second total number of instructions.

3. The method of claim 1, comprising instructing the second processor to delay processing if the second total number of instructions is greater than or equal to the first total number of instructions.

4. The method of claim 1, comprising instructing a third processor to iteratively execute instructions via a third plurality of iterations until the predetermined time period has elapsed, wherein a number of instructions executed in each iteration of the third plurality of iterations is less than a number of instructions executed in a prior iteration of the third plurality of iterations.

5. The method of claim 4, comprising determining a third total number of instructions executed by the third processor during the predetermined time period.

6. The method of claim 5, comprising instructing the third processor to execute a third calculated number of instructions if the third total number of instructions is less than the first total number of instructions or the second total number of instructions.

7. The method of claim 5, comprising instructing the third processor to delay processing if the third total number of instructions is greater than or equal to the first total number of instructions, and if the third total number of instructions is greater than or equal the second total number of instructions.

8. The method of claim 5, comprising instructing the first processor to execute a second calculated number of instructions if the first total number of instructions is less than the second total number of instructions or the third total number of instructions.

9. The method of claim 5, comprising instructing the first processor to delay processing if the first total number of instructions is greater than or equal to the second total number of instructions, and if the first total number of instructions is greater than or equal to the third total number of instructions.

10. The method of claim 5, comprising instructing the second processor to execute the first calculated number of instructions if the second total number of instructions is less than the first total number of instructions or the third total number of instructions.

11. The method of claim 5, comprising instructing the second processor to delay processing if the second total number of instructions is greater than or equal to the first total number of instructions, and if the second total number of instructions is greater than or equal to the third total number of instructions.

12. A method comprising:
    receiving input data into a system;
    providing the input data to a plurality of processors;
    executing application code using the input data to produce a respective plurality of outputs from the plurality of processors; and
    applying a distributed consensus algorithm to the respective plurality of outputs to produce a consensus output;
    wherein the plurality of processors comprises:
       a first processor configured to iteratively execute instructions via a lost plurality of iterations until a predetermined time period has elapsed, wherein a number of instructions executed in each iteration of the first plurality of iterations is less than a number of instructions executed in a prior iteration of the first plurality of iterations; and
       a second processor synchronized with the first processor configured to iteratively execute instructions via a second plurality of iterations until the predetermined time period has elapsed, wherein a number of instructions executed in each iteration of the second plurality of iterations is less than a number of instructions executed in a prior iteration of the second plurality of iterations, wherein executing the input data comprises instructing the second processor to execute a calculated number of instructions if the second total number of instructions is less than the first total number of instructions.

13. The method of claim 12, wherein executing the input data comprises determining a first total number of instructions executed by the first processor during the predetermined time period and determining a second total number of instructions executed by the second processor during the predetermined time period.

14. The method of claim 13, wherein executing the input data comprises instructing the second processor to delay processing if the second total number of instructions is greater than or equal to the first total number of instructions.

* * * * *